(12) United States Patent
Gupta et al.

(10) Patent No.: US 7,275,822 B2
(45) Date of Patent: Oct. 2, 2007

(54) PROGRESSIVE ADDITION LENSES WITH ADJUSTED IMAGE MAGNIFICATION

(75) Inventors: Amitava Gupta, Roanoke, VA (US); Timothy R. Poling, Fincastle, VA (US); Richard J. Nason, Guilford, CT (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 559 days.

(21) Appl. No.: 10/803,716

(22) Filed: Mar. 18, 2004

(65) Prior Publication Data

US 2006/0146280 A1    Jul. 6, 2006

(51) Int. Cl.
  G02C 7/02    (2006.01)
  G02C 7/06    (2006.01)

(52) U.S. Cl. .................. 351/177; 351/159; 351/169

(58) Field of Classification Search .......... 351/159, 351/177
  See application file for complete search history.

(56) References Cited

U.S. PATENT DOCUMENTS 5,162,824 A * 11/1992 Klemka ............. 351/158
5,926,250 A    7/1999 Mukaiyama et al.
6,019,470 A    2/2000 Mukaiyama et al.
6,061,189 A * 5/2000 Caplan et al. ........... 359/744
6,775,060 B2 * 8/2004 Peli et al. ................ 359/409
2003/0160940 A1 8/2003 Welk et al.

FOREIGN PATENT DOCUMENTS

WO    WO 01/81985    11/2001

OTHER PUBLICATIONS

Stein, Harold. A., et al., The Ophthalmic Assistant: Fundamentals and Clinical Practice, 5th ed., pp. 641-648 (1988).

* cited by examiner

Primary Examiner—Jordan M. Schwartz
(74) Attorney, Agent, or Firm—Occhiuti Rohlicek & Tsao LLP

(57) ABSTRACT

The invention provides a method for increasing the magnification of a lens without changing the dioptric power. The method of the invention uses a measurement or an estimate of an individual's retinal function in designing the lens to provide the magnification needed by the individual without increasing the dioptric power of the individual's lens.

10 Claims, 4 Drawing Sheets

Angular Magnification

PROGRESSIVE ADDITION LENSES WITH ADJUSTED IMAGE MAGNIFICATION

FIELD OF THE INVENTION

The present invention relates to progressive addition lenses. In particular, the invention provides progressive addition lenses in which the image magnification is tailored to the wearer's requirements.

BACKGROUND OF THE INVENTION

The use of ophthalmic lenses for the correction of ametropia is well known. For example, multifocal lenses, such as progressive addition lenses ("PALs"), are used for the treatment of presbyopia. The progressive surface of a PAL provides far, intermediate, and near vision in a gradual, continuous progression of increasing dioptric power from far to near focus.

Presbyopia results from a decrease in the eye's ability to focus near objects. This decrease is believed to be due to one or both of hardening of the lens and weakening of the ciliary muscle. Presbyopia results in a decrease in the individual's ability to read small print. Additionally, as one ages there is a decrease in the retina's ability to resolve fine detail in a focused image.

Resolution can be improved by magnification. However, conventional PALs provide only a fixed magnification that is based on the lens power. Thus, an individual may have spectacle lenses that provide the appropriate add power to enable the individual to read small print, but the lenses will not provide the magnification necessary the achieve the desired resolution. If the eye care professional increases the individual's add power prescription by 0.25 diopters ("D") to provide them with a increased magnification, this results in an increase in image blur or defocus.

It is known to provide magnification for an individual based on an approximation of the magnification required. For example Kestenbaum's Rule, in which dividing the distance vision numerator by the denominator provides an approximation of the magnification required for reading Jaeger 5, is known. This, and other known methods for providing increased magnification are disadvantageous in that they require changes in the lens' power to increase magnification, thus altering the position of best focus. Thus, there exists a need for providing magnification without changing the dioptric power of the lens.

DESCRIPTION OF THE INVENTION AND ITS PREFERRED EMBODIMENTS

Figure 1:
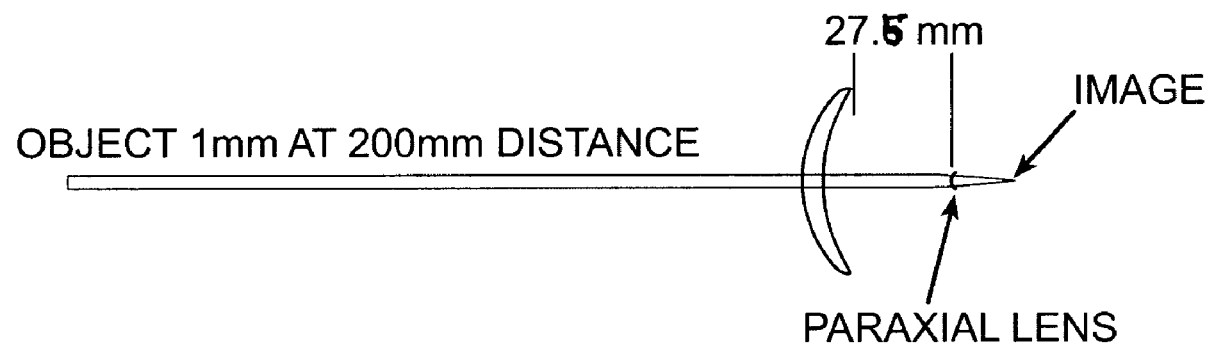
FIG. 1 is a depiction of a ray tracing model that may be used to compute image magnification.

The present invention provides a method for increasing the magnification of a lens without changing the dioptric power, lenses produced according to the method, and methods of manufacturing such lenses. The method of the invention uses a measurement or an estimate of an individual's retinal function in designing the lens to provide the magnification needed by the individual without increasing the dioptric power of the individual's lens.

In one embodiment, the invention provides a method for producing a pair of spectacle lenses, comprising, consisting essentially of, and consisting of a.) determining a refractive power for each lens of a pair of lenses based on an individual's dioptric power prescription; b.) determining an individual's resolution; and c.) varying a magnification for each lens of the lens pair based on the resolution determined, wherein the magnification is varied without substantially varying the refractive power of the lens pair. In a preferred embodiment, the lenses are progressive addition lenses.

For purposes of the invention, by "magnification" is meant the ratio of the uncorrected retinal image size to the corrected image size. One ordinarily skilled in the art will recognize that the ratio may be of any image dimension including, without limitation, the ratio of angular image size or the ratio of image length. By "resolution" is meant the ability of an individual's retina to resolve fine detail in a focused image. By "without substantially varying the refractive power" is meant that the dioptric power changes less than about 0.01 diopters. By "progressive addition lens" is meant a lens that has at least one progressive addition surface. By "progressive addition surface" or "progressive surface" is meant a continuous, aspheric surface having far and near vision zones and an intermediate vision zone of increasing or decreasing dioptric power connecting the far and near vision zones.

In the first step of the method of the invention the refractive power desired for a lens, or each lens of the lens pair, that is an individual's dioptric power prescription, or dioptric power required to correct the individual's visual acuity, is determined. The prescription will include one or more of spherical power, cylinder power and axis, and add power necessary to correct the individual's visual acuity. The prescription may be determined by any conventional method such as by use of an autorefractor, photoropter, or the like. One ordinarily skilled in the art will recognize that a first magnification will be inherent in the dioptric power determined to be required to correct the individual's visual acuity.

In the second step of the method of the invention, the individual's resolution is determined. This determination may be made either directly or indirectly. To determine resolution directly, the individual's retinal function may be measured by use of retinal scanning equipment including, without limitation, a scanning laser ophthalmoscope, a retinal scanning camera, or the like.

Retinal function may also be directly measured by carrying out contrast sensitivity measurements. For example, a sine wave grating of a specific spatial frequency may be presented on a screen to an individual, which gratings are below the individual's recognition threshold. The individual thus will recognize a screen of constant luminance. By increasing the contrast of the grating to the point that the individual first reports seeing the grating, an endpoint representing the contrast threshold may be established. The individual's contrast sensitivity will be the reciprocal of the contrast threshold. Testing may be repeated for additional spatial frequencies to produce a plot that is the contrast sensitivity curve. Commercially available apparatuses for measuring contrast sensitivity include, without limitation, Medtronics Ophthalmics B-VAT PC or B-VAT II, Vector Vision CSV-100, Stereo-Optical F.A.C.T. and the like.

Alternatively, resolution may be indirectly determined based on a consideration of the individual's age. Any number of reference materials disclose such information including, without limitation, D. B. Elliott, K. C. H. Yang and D. Whitaker, *Visual Acuity Changes Throughout Adulthood in Normal, Healthy Eyes: Seeing Beyond 6/6*, 72 Optom. Vis. Sci., 186-191 (1995) and T. T. Norton et al. eds., *The Psychophysical Measurement of Visual Function*, p 314-317 (2002) Preferably, the resolution is determined directly.

Once the individual's resolution is determined, the magnification of each lens of the lens pair may be varied based on the resolution measurement. For example, based on a consideration of the individual's age, 0.5% magnification may be added to a lens for each decade of the age. Alternatively, using contrast sensitivity measurements, a prescribed percentage of magnification necessary to correct the individual's retinal function may be added.

One way in which the magnification may be varied in the design of a lens without changing the individual's prescription considers that the lens magnification is given by the following equation:

$$M = \left[\frac{1}{1 - \frac{tF_1}{n}}\right]\left[\frac{1}{1 - hF_v}\right] \quad (I)$$

wherein M is the lens magnification;

t is the lens thickness;

n is the refractive index of the lens material;

$F_1$ is the curvature of the front surface of the lens;

h is the distance from the back vertex, or distance from the point of intersection on the lens of the principal axis, to the entrance pupil of the eye; and $F_v$ is the back vertex power, or the reciprocal of the distance, in air, from the back surface of the lens to the secondary focal point.

In Equation I, each of the variables controls magnification. By increasing one of the lens thickness, index of refraction of the lens material, or the vertex distance, the magnification may be increased without changing the power of the lens. Similarly, decreasing one of these variables results in a decrease in magnification. As yet another alternative, more than one variable may be increased or decreased.

For example, by increasing t, the magnification will increase, but the lens power will remain substantially constant because the power is determined by the front and back surface curves and the refractive index of the lens material. Thus, only a small, second order effect on power results as t changes. This is shown in Equation II, which is Equation I simplified for individuals requiring refractive correction because of error in the corneal curvature rather than the axial length of the eye. In these cases, Equation I reduces to:

$$M = \left[\frac{1}{1 - hF_{SP}}\right] \quad (II)$$

wherein h is the distance of the back vertex of the lens from the pupillary aperture; and $F_{SP}$ is the equivalent lens power based on the front and back curvatures, refractive index of the lens material and lens thickness.

In Equation II, $F_{sp}$ is corrected for changes in lens thickness, refractive index and the like. Equation II shows that magnification provided by the lens can increase if the pupillary plane of the eye from the posterior lens pole h increases. $F_{sp}$ may be maintained as constant at the same time that the front and back curves of the lens change provided that the changes in the front curve are matched with the changes in the back curve so that $F_{sp}$ does not change.

Tables 1 and 2 below list add powers provided by lenses in which both the front and back surfaces are progressive surfaces. Each lens of Table 1 has a 2.00 D add power and each lens of Table 2 has a 3.00 D add power yet the front and back curves of the lenses differ. Thus, the equivalent power, or focusing effect on the retina computed by taking into account the lens optic and its distance from the entrance pupil, in the near vision zone of each of the examples differs.

TABLE 1

| Example | Add Power | Base Curve | Front Surface Add Power | Back Surface Add Power | Front Add Curve | Back Add Curve | Center Thickness (mm) |
|---|---|---|---|---|---|---|---|
| A | 2.00D | 3.00D | 0.00D | 2.00D | 3.00D | −1.00D | 3.26028 |
| B | 2.00D | 5.00D | 0.00D | 2.00D | 5.00D | −3.00D | 3.28975 |
| C | 2.00D | 7.00D | 3.00D | −1.00D | 10.00D | −8.00D | 3.48095 |

TABLE 2

| Example | Add Power | Base Curve | Front Surface Add Power | Back Surface Add Power | Front Add Curve | Back Add Curve | Center Thickness (mm) |
|---|---|---|---|---|---|---|---|
| D | 3.00D | 3.00D | 1.00D | 2.00D | 4.00D | −1.00D | 3.90012 |
| E | 3.00D | 5.00D | 2.50D | 0.50D | 7.50D | −4.50D | 4.01599 |
| F | 3.00D | 7.00D | 5.00D | −2.00D | 12.00D | −9.00D | 4.39048 |

The magnification, in terms of ratio of angular image size, of the lenses is shown in Table 3. The angular magnification is a ratio of paraxial image space chief ray angle to the paraxial object space chief ray angle, which angles are measured with respect to the paraxial entrance and exit pupil locations.

TABLE 3

| Example | Angular Magnification |
|---|---|
| A | 1.06 |
| B | 1.07 |
| C | 1.09 |
| D | 1.10 |
| E | 1.11 |
| F | 1.14 |

Another means for varying the magnification is to utilize ray tracing analysis. For example, commercially available optical design software including, without limitation, ZEMAX™ software may be used to compute a retinal image size. By way of example, the eye model may be a 60.7 D paraxial lens placed 27.5 mm behind the back vertex point of a lens. FIG. 1 provides a schematic description of the ray tracing model that may be used to compute image magnification. In FIG. 1, a 1 mm size object is shown placed at a fixed distance in front of the lens. The image size may be computed using two different models: one in which the edge of the lens is fixed while the vertex distance is varied and one in which both the lens edge and vertex distance of the lens was fixed.

Figure 2:
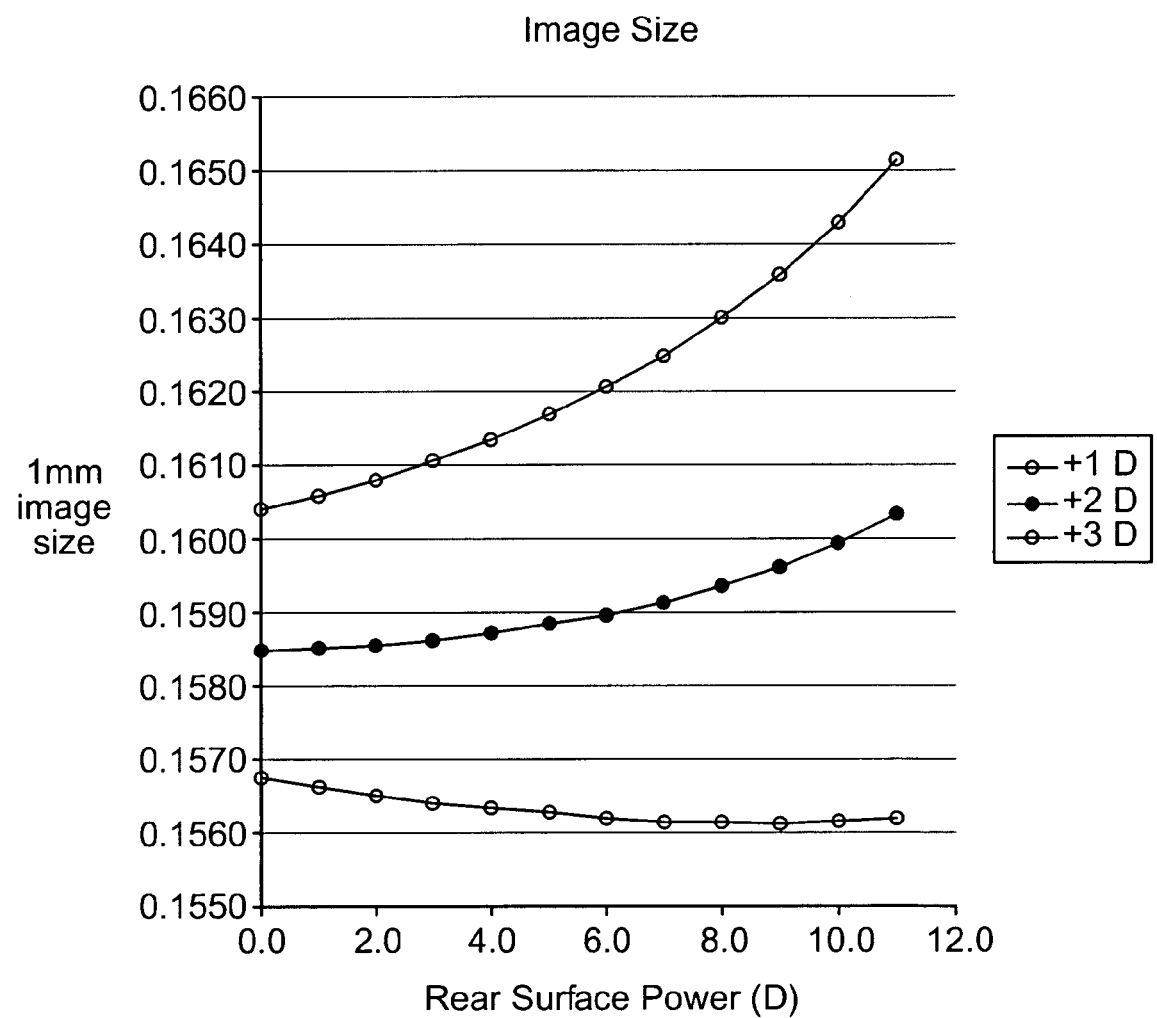
FIG. 2 is a graph in which image size is plotted as a function of the back surface curvature.
Figure 3:
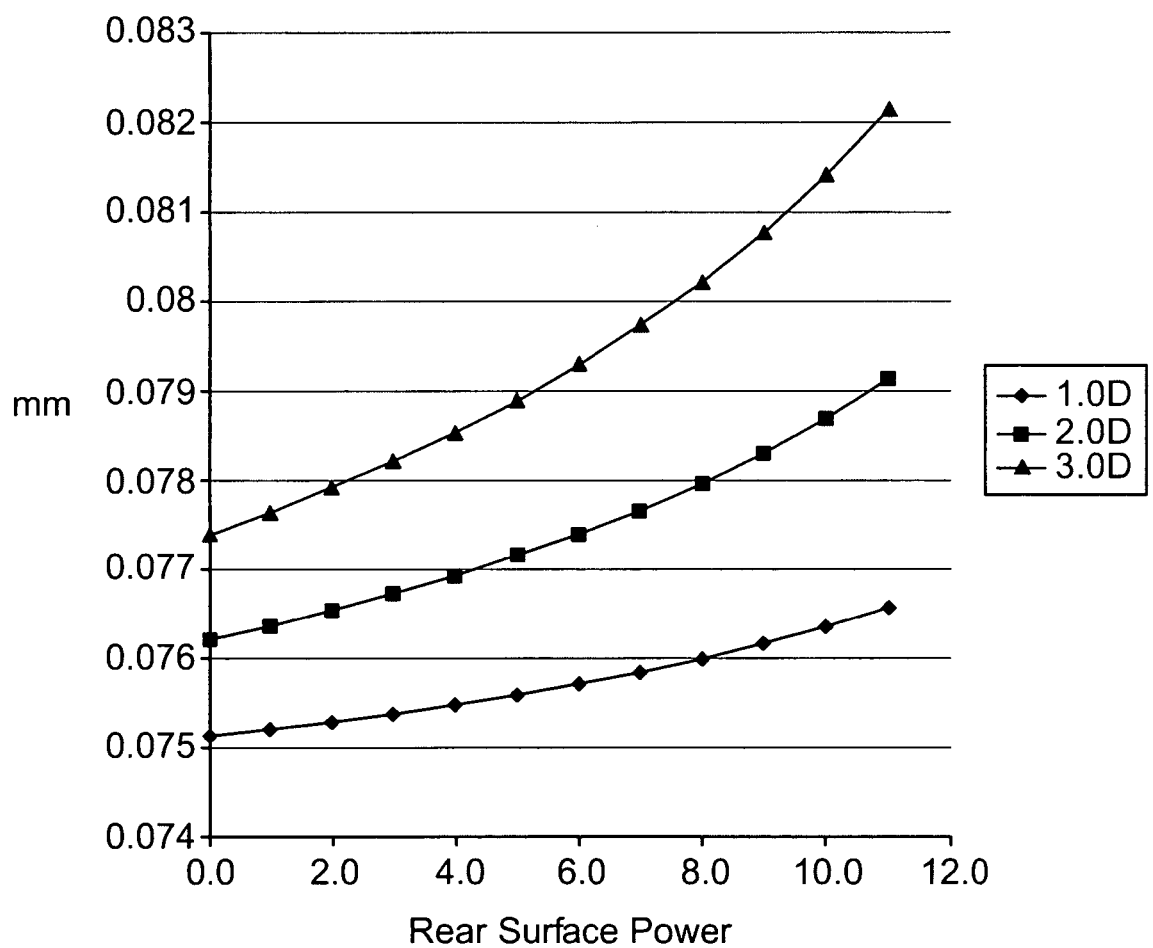
FIG. 3 is a second graph in which image size is plotted as a function of the back surface curvature.

By way of example, plano progressive addition lenses were modeled with add powers of 1.00, 2.00 and 3.00 diopters. FIG. 2 is a plot of the image size as a function of the curvature of the back surface for each of the add powers. A 1.0 mm object was placed 200 mm away from the 60.7 diopters para-axial lens used to simulate the eye. The image sizes were computed assuming that the edge of the lens body was fixed while varying the back vertex distance to simulate actual lens wearing situations as closely as possible. In FIG. 3 is shown a plot of image sizes for a 1.0 mm object placed 450 mm away from the lens.

Figure 4:
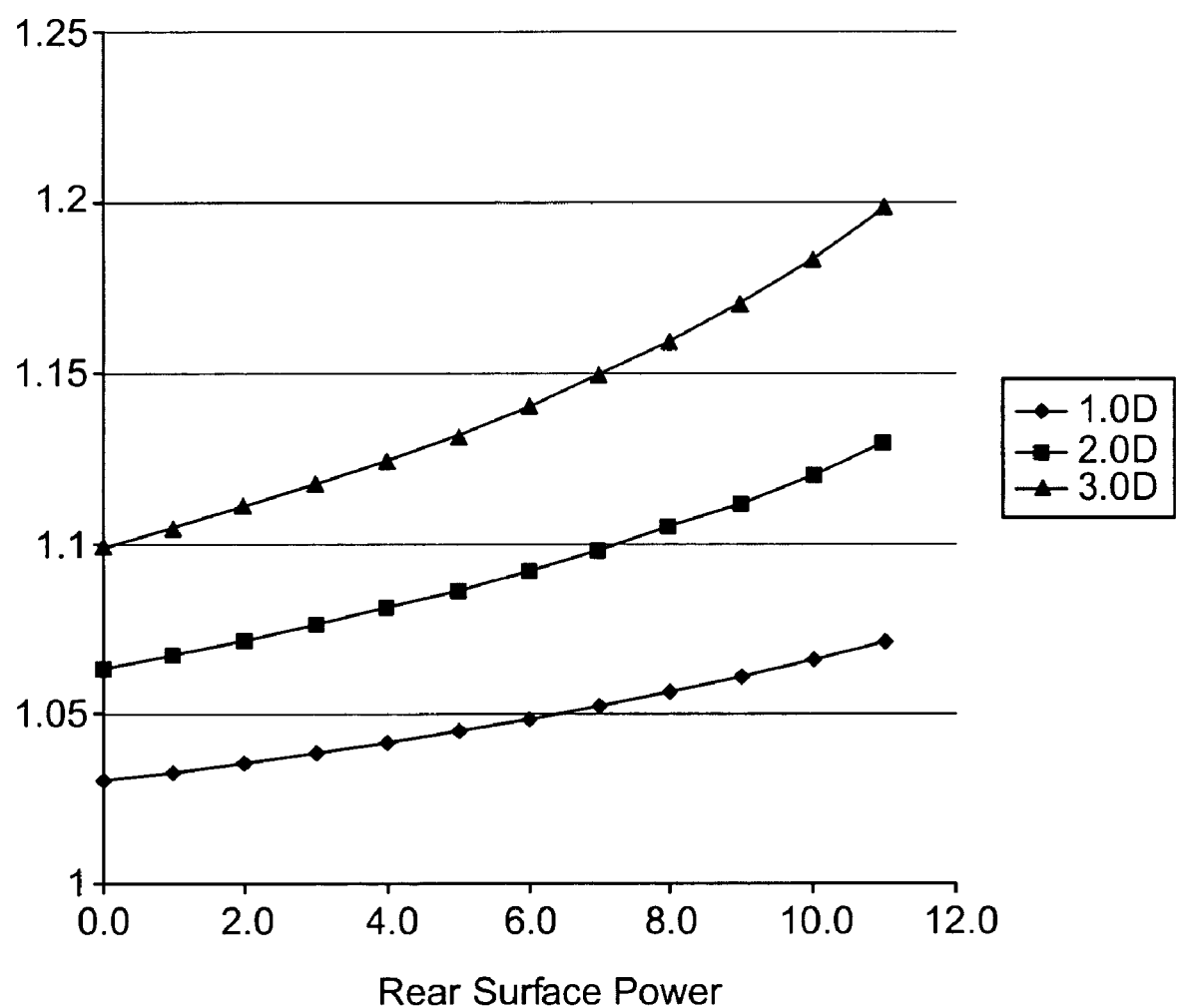
FIG. 4 is a graph in which the angular magnification is plotted as a function of the back surface curvature.

FIG. 4 is a plot of the magnification, in terms of angular image size, of the focused image of an object placed 450 mm in front of the lens as a function of the rear add power zone curvature for add powers of 1.00, 2.00 and 3.00 diopters. Far vision was assumed to be plano. Table 4 shows the magnification, in terms of angular image size, provided by a progressive addition lens with front and back progressive surfaces as the curvature of the add power zone is varied from 0.00 to 11.00 diopters. Included are examples A through F of Tables 1 and 2. The data show that the angular magnification computed for examples A through F are in satisfactory agreement with the more approximate data computed using equations 1 and 2.

TABLE 4

|  | Back add curve | 1.00D | 2.00D | 3.00D |
|---|---|---|---|---|
|  | 0.0D | 1.030 | 1.063 | 1.099 |
| A | −1.00D |  | 1.067 |  |
| B | −3.00D |  | 1.076 |  |
| C | −8.00D |  | 1.104 |  |
| D | −1.00D |  |  | 1.105 |
| E | −4.50D |  |  | 1.128 |
| F | −9.00D |  |  | 1.171 |
|  | −11.0D | 1.071 | 1.129 | 1.198 |

The trade-off between curvature and add power for magnification should be noted. For example, to provide magnification of 1.071, one can provide an add power of 1.00 D and a back curve of 11.0 D, or provide an add power of 2.00 D and a back curve of 6.00 D. In other words, changing the back curve from 6.00 D to 11.0 D provides an increase in magnification equivalent to an increase in add power of 1.00 D.

In another embodiment of the invention, lens design may be altered so as to minimize the image magnification difference between the lenses of a lens pair. Frequently, individuals will need different refractive prescriptions for each eye to correct their visual acuity. This results in the need to use different front and back curves for each lens and, if the add power is the same in both eyes, different add power curves result. The result is that the image magnification varies between the eyes because the power factor and shape factors of each lens are different. The difference in image magnification between the eyes results in an inability to fuse the two images. The present invention solves this problem because the lens design may be adjusted so that magnification is changed by placing all of the add power for one lens on the back surface of the lens and all add power for the other lens on the front surface. Thus in an alternative embodiment, the invention provides a method for producing a pair of spectacle lenses, comprising, consisting essentially of, and consisting of a.) determining a refractive power for each lens of a pair of lenses based on an individual's dioptric power prescription; and b.) varying the magnification for each lens of the lens pair so that the magnification difference between the lenses is minimized. Preferably, in a lens pair, the lens with the least amount of add power will have all of the add power on the front surface and the lens with most add power will have all of the add power on the back surface of the lens.

The invention will be further clarified by a consideration of the following, non-limiting examples.

EXAMPLES

Example 1

An individual's refractive power is determined to be as follows: +1.25 D Sph, 0.0 D Cyl., 2.00 D Add OD and +3.50 D Sph, 0.0 D Cyl, and 2.00 D add power OS. The OD base curve is 6.00 D with an image magnification of 1.0279 (2.79%) and the OS base curve is 8.00 D with an image magnification of 1.0778 (7.78%). The OD add power sphere power is 3.25 D with a curvature is 8.00 D and the OS add power sphere power is 5.25 D with a curvature of 10.00 D. The near magnification of 1.04 for OD and 1.08 for OS resulting in a 4% difference between the eyes in magnification.

The add power for OS is then placed entirely on the back surface and entirely on the front surface for OD. This results in an image magnification for OD of 1.076 and 1.078 for OS.

What is claimed is:

1. A method for producing a pair of spectacle lenses, comprising: a.) determining a refractive power for each lens of a pair of lenses based on an individual's dioptric power prescription; b.) determining an individual's resolution; and c.) varying a magnification for each lens of the lens pair based on the resolution determined, wherein the magnification is varied without substantially varying the refractive power of the lens pair.

2. The method of claim 1, wherein the lenses are progressive addition lenses.

3. The method of claim 1, wherein the resolution is determined through the use of retinal scanning equipment.

4. The method of claim 2, wherein the resolution is determined through the use of retinal scanning equipment.

5. The method of claim 1, wherein step c.) further comprises varying the magnification by varying at least one of t, n, and h, in the following equation:

$$M = \left[\frac{1}{1-\frac{tF_1}{n}}\right]\left[\frac{1}{1-hF_v}\right]$$

wherein M is the lens magnification;
t is the lens thickness;
n is the refractive index of the lens material;
$F_1$ is the curvature of the front surface of the lens;
h is the distance from the back vertex, or distance from the point of intersection on the lens of the principal axis, to the entrance pupil of the eye; and
$F_v$ is the back vertex power, or the reciprocal of the distance, in air, from the back surface of the lens to the secondary focal point.

6. The method of claim 2, wherein step c.) further comprises varying the magnification by varying at least one of t, n, and h, in the following equation:

$$M = \left[\frac{1}{1-\frac{tF_1}{n}}\right]\left[\frac{1}{1-hF_v}\right]$$

wherein M is the lens magnification;
t is the lens thickness;
n is the refractive index of the lens material;
$F_1$ is the curvature of the front surface of the lens;
h is the distance from the back vertex, or distance from the point of intersection on the lens of the principal axis, to the entrance pupil of the eye; and
$F_v$ is the back vertex power, or the reciprocal of the distance, in air, from the back surface of the lens to the secondary focal point.

7. The method of claim 4, wherein step c.) further comprises varying the magnification by varying at least one of t, n, and h, in the following equation:

$$M = \left[\frac{1}{1-\frac{tF_1}{n}}\right]\left[\frac{1}{1-hF_v}\right]$$

wherein M is the lens magnification;
t is the lens thickness;
n is the refractive index of the lens material;
$F_1$ is the curvature of the front surface of the lens;
h is the distance from the back vertex, or distance from the point of intersection on the lens of the principal axis, to the entrance pupil of the eye; and
$F_v$ is the back vertex power, or the reciprocal of the distance, in air, from the back surface of the lens to the secondary focal point.

8. The method of claim 1, wherein step c.) further comprises varying the magnification by using ray tracing analysis.

9. The method of claim 2, wherein step c.) further comprises varying the magnification by using ray tracing analysis.

10. The method of claim 4, wherein step c.) further comprises varying the magnification by using ray tracing analysis.

* * * * *